United States Patent [19]
Takahira et al.

[11] Patent Number: 6,007,454
[45] Date of Patent: Dec. 28, 1999

[54] TRACTION CONTROL DEVICE OF AUTOMOBILE AUTOMATICALLY ADAPTED FOR HIGH AND LOW GEAR DRIVING

[75] Inventors: Yosuke Takahira, Toyota; Kazushi Hosomi, Susono, both of Japan

[73] Assignee: Toyota Jidosha Kabushiki Kaisha, Toyota, Japan

[21] Appl. No.: 09/172,158

[22] Filed: Oct. 14, 1998

[30] Foreign Application Priority Data

Nov. 5, 1997 [JP] Japan ................................ 9-319048

[51] Int. Cl.[6] ......................... B60K 41/26; B60K 41/20
[52] U.S. Cl. ......................... 477/92; 477/184; 477/185; 477/187; 188/181 C; 192/219; 701/83; 701/84; 701/89; 180/197
[58] Field of Search ......................... 477/92, 182, 183, 477/184, 185, 186, 187; 192/219; 188/181 R, 181 C; 701/83, 84, 89; 180/197

[56] References Cited

U.S. PATENT DOCUMENTS

| 4,685,547 | 8/1987 | Ohashi et al. ......................... 477/184 |
| 4,763,912 | 8/1988 | Matsuda ................................. 180/197 |
| 4,850,656 | 7/1989 | Ise et al. ............................. 477/184 X |
| 5,107,430 | 4/1992 | Magnino ..................................... 701/83 |
| 5,737,714 | 4/1998 | Matsuno et al. ....................... 701/89 X |

OTHER PUBLICATIONS

New Model Instruction Manual of Pajero of Mitsubishi Motor Corp., No. 1033742, Jan. 1991.

*Primary Examiner*—Sherry L. Estremsky
*Attorney, Agent, or Firm*—Oliff & Berridge, PLC

[57] ABSTRACT

In an automobile having a pair of front wheels, a pair of rear wheels, a brake system for selectively braking each of the pairs of front and rear wheels, an engine, a transmission system including a speed change gear device for selectively providing a plurality of transmission gear ratios, a center differential device, a front differential device, and a rear differential device, the traction control device detects slipping conditions of each of the pairs of front and rear wheels, and controls the brake system so as to brake at least one of the pairs of front and rear wheels for execution of traction controls according to one of at least two separate traction control programs which are automatically changed over for execution according to selections of the transmission gear ratios of the speed change gear device for a relatively high speed driving or a relatively low speed driving.

7 Claims, 3 Drawing Sheets

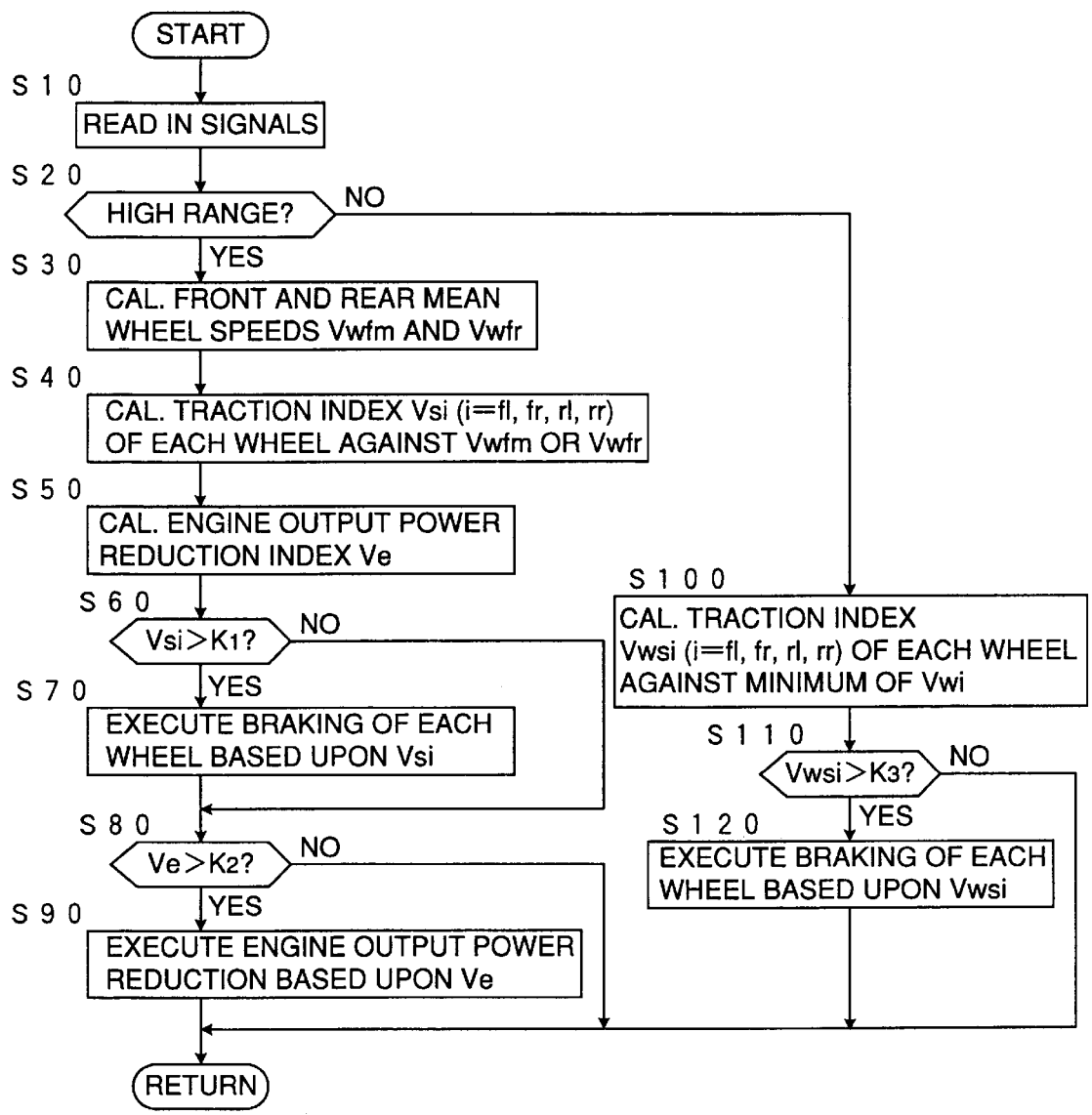

TRACTION CONTROL DEVICE OF AUTOMOBILE AUTOMATICALLY ADAPTED FOR HIGH AND LOW GEAR DRIVING

BACKGROUND OF THE INVENTION

1. Field of the Invention

The present invention related to a traction control of automobiles, and more particularly, to a traction control device automatically adapted to selections of transmission gear ratios of the speed change gear device for a relatively high speed driving and a relatively low speed driving.

2. Description of the Prior Art

The four wheel drive automobiles are generally constructed to have a pair of front wheels, a pair of rear wheels, an engine, and a transmission system including a speed change gear device for selectively providing a plurality of transmission gear ratios, a center differential device, a front differential device, and a rear differential device, the transmission system transmitting rotational output power of the engine to the pair of front wheels and the pair of rear wheels with the engine output power being divided by the center differential device into a front drive power part for driving the pair of front wheels and a rear drive power part for driving the pair of rear wheels, the front drive power part being further divided by the front differential device between the pair of front wheels, while the rear drive power part being divided by the rear differential device between the pair of rear wheels.

In the New Model Introduction Manual of PAJERO of Mitsubishi Motor Corporation issued on January 1991, there is described a four wheel drive automobile having a transmission device incorporating an automatic locking up control of the center differential device interrelated with the speed stage shifting of the transmission device, so that the automobile is driven with the center differential device being automatically locked up when the transmission device is shifted for driving the automobile on a rough road, sand or a snow ground or for climbing a steep uphill, so as to suppress a substantial difference of slippage which would occur between the front and rear wheels in those operating conditions.

On the other hand, in the modern automobiles in which the behavior control systems are incorporated so as to automatically control the running behavior, particularly turning behavior of the automobiles against spinning or drifting out, the automobiles are each equipped with a brake system for selectively braking each of the pairs of front and rear wheels independently of the others under the control of a micro-computer which conducts certain behavior control calculations.

SUMMARY OF THE INVENTION

When an automobile is equipped with a brake system operative to brake each of the pairs of front and rear wheels independently of the others, it is contemplated that a selective locking up of the center, front and rear differential devices for a traction control can be effected by selectively braking each of the pairs of front and rear wheels.

In view of the above, it is a primary object of the present invention to provide a traction control device of a four wheel drive automobile in which a brake system adapted to selectively brake each of the pairs of front and rear wheels is effectively utilized for a traction control of the automobile without requiring a lock-up device for the center, front and rear differential devices.

According to the present invention, the above-mentioned primary object is accomplished by a traction control device of an automobile having a pair of front wheels, a pair of rear wheels, a brake system for selectively braking each of the pairs of front and rear wheels, an engine, a transmission system including a speed change gear device for selectively providing a plurality of transmission gear ratios, a center differential device, a front differential device, and a rear differential device, the transmission system transmitting rotational output power of the engine to the pair of front wheels and the pair of rear wheels with the engine output power being divided by the center differential device into a front (hive power part for driving the pair of front wheels and a rear drive power part for driving the pair of rear wheels, the front drive power part being further divided by the front, differential device between the pair of front wheels, while the rear drive power part being further divided by the rear differential device between the pair of rear wheels, the traction control device comprising means for detecting slipping conditions of each of the pairs of front and rear wheels, and means for controlling the brake system so as to brake at least one of the pairs of front and rear wheels for execution of a traction control according to one of at least two separated traction control programs which are automatically changed over for execution according to selections of the transmission gear ratios of the speed change gear device.

By operating such a brake system for traction controls according to at least two separate traction control programs, at least two desirable selections of operating conditions of the transmission system such as substantially equivalent to the selective locking up of the center differential device will be available for more desirably adapting the automobile to respective driving conditions.

In the above-mentioned traction control device, the speed change gear device may be constructed to provide a first group of transmission gear ratios for driving the automobile at relatively high speeds and a second group of transmission gear ratios for driving the automobile at relatively low speeds, the traction control programs including a first one prepared for execution with a selection of the first group of transmission gear ratios, and a second one prepared for execution with a selection of the second group of transmission gear ratios.

In this case, the first traction control program may be prepared such that when rotation speed of one of the front wheels is faster than a mean rotation speed of the pair of rear wheels beyond a threshold value determined therefor, the one front wheels is braked.

Similarly, the first traction control program may be prepared such that when rotation speed of one of the rear wheels is faster than a mean rotation speed of the pair of front wheels beyond a threshold value determined therefor, the one rear wheels is braked.

Further, when the automobile is equipped with means for detecting vehicle speed, the first control program may further be prepared such that when rotation speeds of all of the pairs of front and rear wheels are faster than the vehicle speed beyond a threshold value determined therefor, the engine is controlled to decrease the rotational output power.

On the other hand, the second traction control program may be prepared such that when rotation speed of one of the pairs of front and rear wheels is faster than a lowest of rotation speeds of the pairs of front and rear wheels beyond a threshold value determined therefor, the one wheel is braked.

BRIEF DESCRIPTION OF THE DRAWINGS

In the accompanying drawings,

FIG. 3 is a flowchart showing an embodiment of the traction control device according to the present invention in the form of its control operations.

DESCRIPTION OF THE PREFERRED EMBODIMENT

The present invention will be described in more detail with respect to an embodiment thereof with reference to the accompanying drawings.

Figure 1:
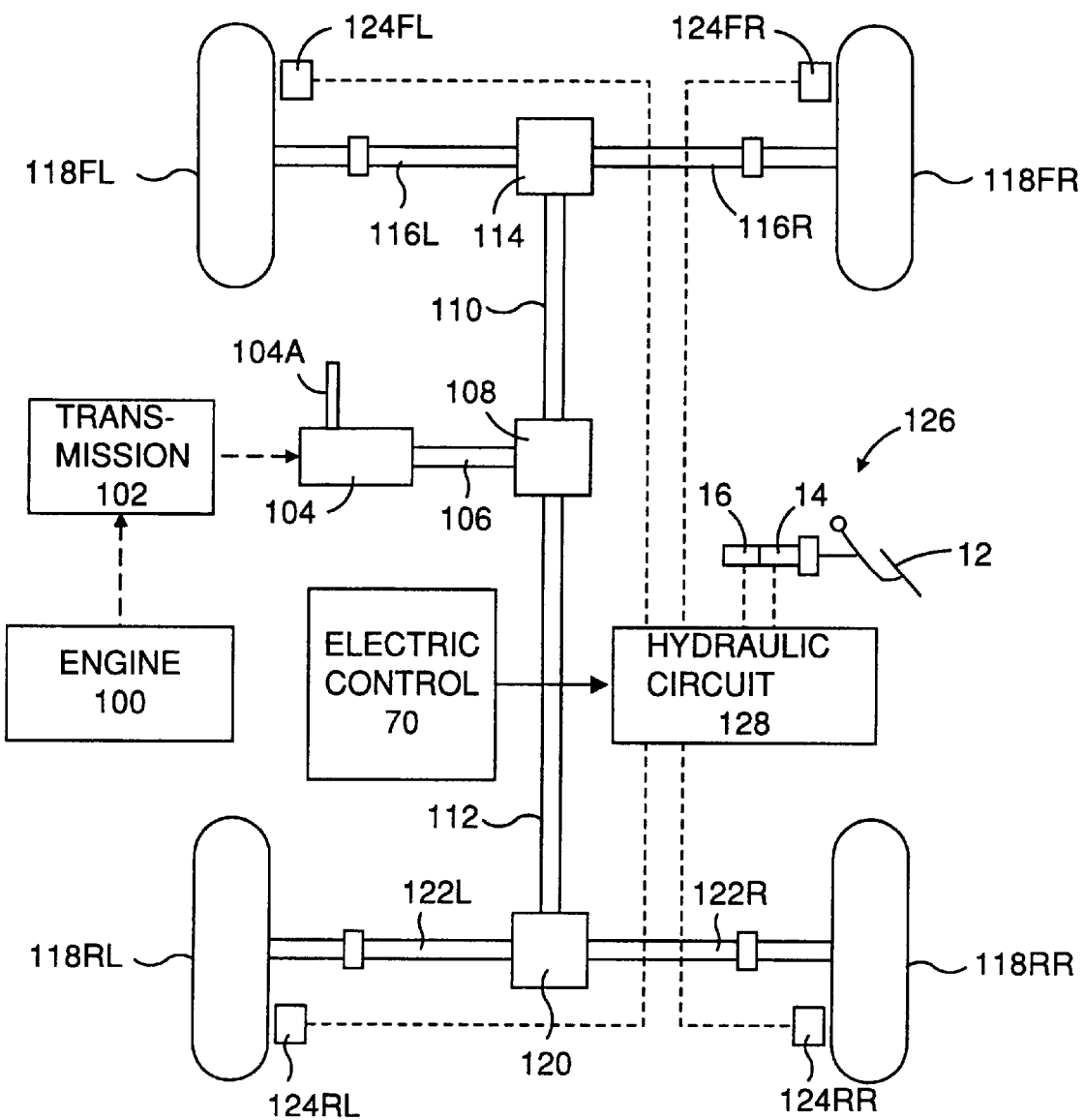
FIG. 1 is a diagrammatical illustration of an automobile in which the traction control device according to the present invention in incorporated.

Referring first to FIG. 1 showing an automobile in a diagrammatical illustration, the automobile has a pair of front wheels, i.e. front left wheel 118FL and front right wheel 118FR, a pair of rear wheels, i.e. rear left wheel 118RL and rear right wheel 118RR, an engine 100, a transmission 102, and a high-low speed changeover gear 104 adapted to be changed over by a manual lever 104A to provide a high speed gear ratio or a low speed gear ratio in transmitting the output rotational power of the engine 100 through the transmission 102 to an input shaft 106 of a center differential gear 108. The rotational power inputted to the center differential gear 108 is divided into a front part transmitted through a shaft 110 to a front differential gear 114 which divides its input rotational power into a front left axle 116L for driving the front left wheel 118FL and a front right axle 116R for driving the front right wheel 118FR, and a rear part transmitted through a shaft 112 to a rear differential gear 120 which divides its input rotational power into a rear left axle 122L for driving the rear left wheel 118RL and a rear light axle 122R for driving the rear right wheel 118RR. The automobile is further equipped with a brake system including the conventional manual brake means 126 consisting of a brake pedal 12, a master cylinder 14 and a hydro-booster 16, a hydraulic circuit 128 shown in more detail in FIG. 2, wheel cylinders 124FL, 124FR, 124RL and 124RR provided for applying braking forces to the front left, front right, rear left and rear right wheels, respectively, according to a supply of a pressurized brake fluid from the hydraulic circuit 128, and an electric control means 70 for controlling the operation of the hydraulic circuit 128 via electromagnetic actuators (not shown) of the respective changeover valves included therein, as described in detail hereinbelow.

Figure 2A:
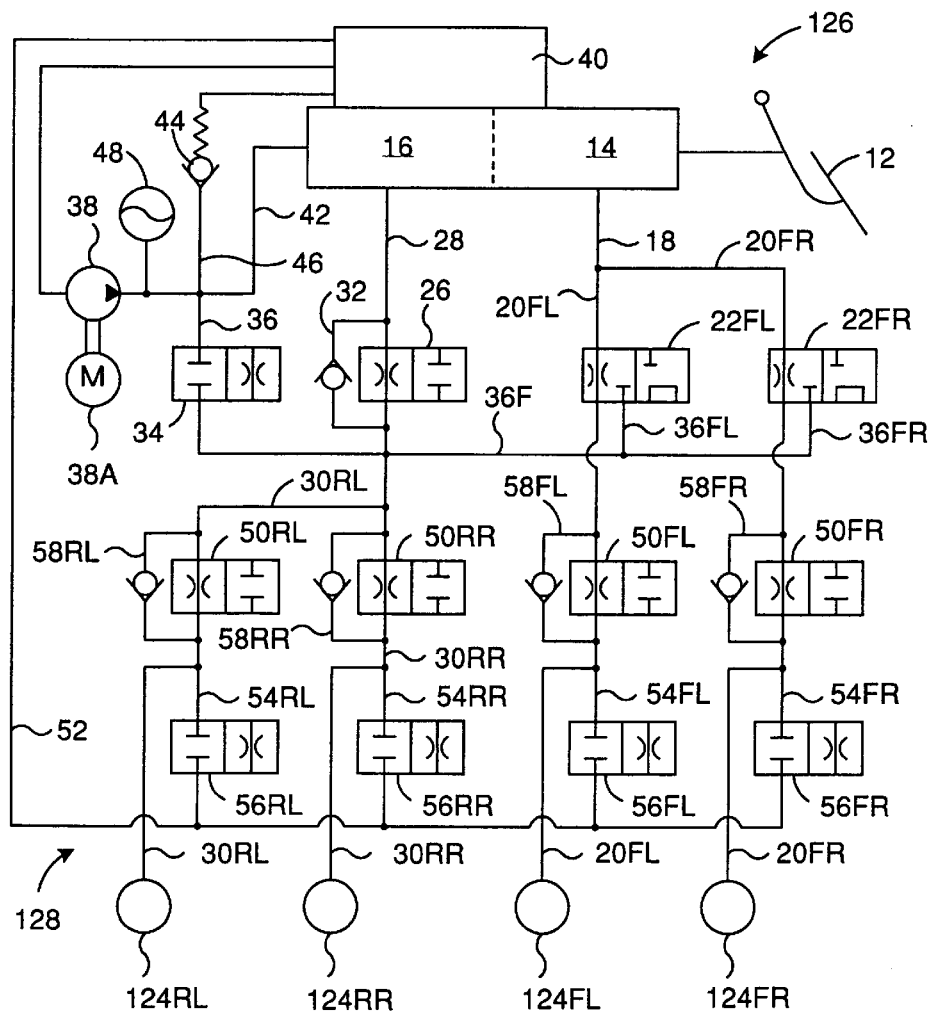
FIG. 2A is a diagrammatical illustration of a hydraulic circuit constructed to execute a behavior control system of an automobile in which the traction control device according to the present invention is incorporated.

In FIG. 2A, the manual brake means 126 including the brake pedal 12 to be depressed by a driver, the master cylinder 14 and the hydro-booster 16 are the same as shown in FIG. 1. A brake fluid pressurized by the master cylinder 14 according to a depression of the brake pedal 12 is conducted through a passage 18 and branch passages 20FL and 20FR to the wheel cylinders 124FL and 124FR of the front left and front right wheels. respectively. The passage 20FL incorporates changeover valves 22FL and 50FL in series. The changeover valve 22FL normally opens the passage 20FL through and selectively interrupts the downstream side of the passage 20FL from its upstream side connected with the master cylinder 14, while connecting the downstream side of the passage 20FL to a passage 36FL branched from a passage 36F adapted to be supplied with an accumulator pressure as described hereinbelow. The changeover valve 50FL normally opens the passage 20FL through and selectively interrupts the passage 20FL. The changeover valve 50FL is bypassed by a bypass passage 58FL including a one way valve oriented to allow the fluid to flow only from the downstream side to the upstream side thereof. Similarly, the passage 20FR incorporates changeover valves 22FR and 50FR in series. The changeover valve 22FR normally opens the passage 20FR through and selectively interrupts the downstream side of the passage 20FR from its upstream side connected with the master cylinder 14, while connecting the downstream side of the passage 20FR with a passage 36FR branched from the passage 36F. The changeover valve 50FR normally opens the passage 20FR through and selectively interrupts the passage 20FR. The changeover valve 50FR is bypassed by a bypass passage 58FR including a one way valve oriented to allow the fluid to flow only from the downstream side to the upstream side thereof.

The wheel cylinder 124FL is connected with a return passage 52 via an exhaust passage 54F incorporating a changeover valve 56FL which normally interrupts the exhaust passage 54FL and selectively opens the exhaust passage 54FL through. Similarly, the wheel cylinder 124FR is connected with the return passage 52 via an exhaust passage 54FR incorporating a changeover valve 56FR which normally interrupts the exhaust passage 54FR and selectively opens the exhaust passage 54FR through.

The pressurized brake fluid generated by the hydrobooster 16 is conducted through a passage 28 incorporating a changeover valve 26 to be branched to two passages 30RL and 30RR leading to rhw wheel cylinders 124RL and 124RR, respectively. The changeover valve 26 normally opens the passage 28 through and selectively interrupts the passage 28. The changeover valve 26 is bypassed by a bypass passage 32 including a one way valve oriented to allow the fluid to flow only from the upstream side to the downstream side thereof. The passage 30RL incorporates a changeover valve 50RL which normally opens the passage 30RL through and selectively interrupts the passage 30RL. The changeover valve 50RL is bypassed by a bypass passage 58RL including a one way valve oriented to allow the fluid to flow only from the downstream side to the upstream side thereof. Similarly, the passage 30RR incorporates a changeover valve 50RR which normally opens the passage 30RR through and selectively interrupts the passage 30RR. The changeover valve 50RR is bypassed by a bypass passage 58RR including a one way valve oriented to allow the fluid to flow only from the downstream side to the upstream side thereof.

The wheel cylinder 124RL is connected with the return passage 52 via an exhaust passage 54RL incorporating a changeover valve 56RL which normally interrupts the exhaust passage 54RL and selectively opens the exhaust passage 54RL through. Similarly, the wheel cylinder 124RR is connected with the return passage 52 via an exhaust passage 54RR incorporating a changeover valve 56RR which normally interrupts the exhaust passage 54RR and selectively opens the exhaust passage 54RR through.

A pump 38 is provided to be driven by an electric motor 38A for selectively pumping the brake fluid from a reservoir 40 to a supply passage 36 connected with the passage 36F via a changeover valve 34 which normally interrupts the communication between the passages 36 and 36F and selectively communicates the passage 36 with the passage 36F. The output of the pump 38 is branched by a passage 42 to be supplied to the hydro-booster 16. The outlet passage 36 is also connected to the reservoir 40 by a relief passage 46 including a pressure relief valve 44. The hydro-booster 16 generates the flow of pressurized brake fluid supplied through the passage 28 from the pressurized brake fluid supplied through the passage 42 to be substantially of the same pressure level as the master cylinder pressure supplied through the passage 18.

Figure 2B:
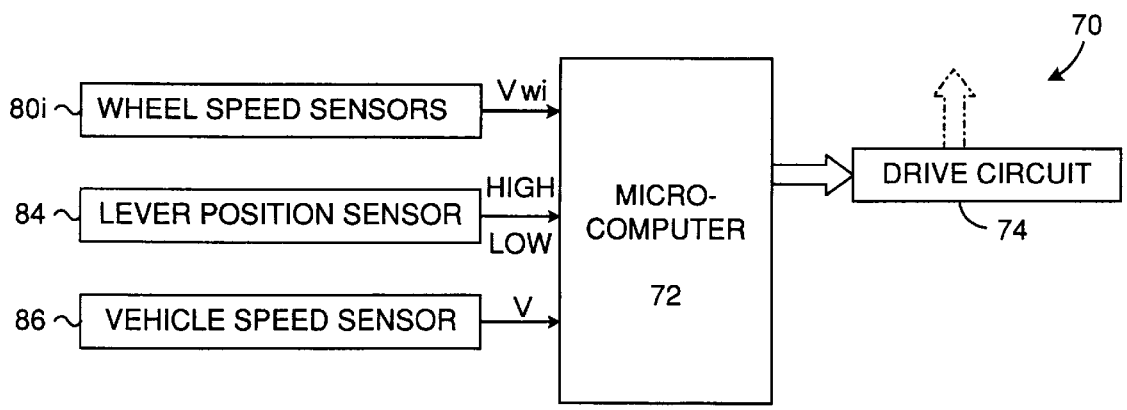
FIG. 2B is a diagrammatical illustration of an electric control part of the behavior control system in which the control part of the traction control device according the present invention is incorporated.

The changeover valves 22FL, etc. are all changed over between the two changeover positions by the respective electromagnetic actuators not shown in the figure under a control of the control system shown in FIG. 2B. The control system of FIG. 2B comprises a microcomputer 72 originally constructed to execute various behavior control calculations for desired behavior control operations of the hydraulic circuit shown in FIG. 2A. However, the microcomputer 72 is of course constructed to also execute the traction control calculations according to the present invention. The microcomputer 72 may be of a standard type including a central processing unit, a random access memory, a read only memory, input and output port means and a common bus interconnecting those components, and is supplied with input information about various parameters required for the original behavior control, and particularly such information required for the traction control according to the present invention, as wheels speeds Vwi (i=fl, fr, rl and rr) of the front left, front right, rear left and rear right wheels from wheel speed sensors 80i (i=fl, fr, rl and rr), a high/low signal from a lever position sensor 84 for detecting the shift position of the manual lever 104A to a high speed position or a low speed position, and vehicle speed V from a vehicle speed sensor 86 such as a supersonic vehicle speed sensor or means for calculating a vehicle speed based upon the general transition of the wheel speeds Vwi.

The microcomputer 72 carries out the original behavior control calculations as well as the traction control calculations according to the present invention based upon the values of the read in parameters and the programs stored in the read only memory, and dispatches instruction signals to a drive circuit 74 which operates the changeover valves 22FL, etc. by energizing or deenergizing the electromagnetic actuators of the respective changeover valves, and the output control means (not shown) of the engine for a reduction of the output power of the engine.

As well known in the art of automobile behavior control, when the automobile running along a leftward curved road is to be suppressed from spinning, the changeover valve 34 is changed over from the position shown in the figure to the position opposite thereto for communicating the passage 36 to the passage 36F, while simultaneously changing over the changeover valve 22FR so that the downstream of the passage 20FR is disconnected from the passage 18 and connected to the passage 36FR, so that the fluid pressure stored in the accumulator 48 is available for operating the wheel cylinder 124FR of the front right wheel, and then the changeover valves 50FR and 56FR are selectively changed over to supply a desired amount of the pressurized fluid to the wheel cylinder 124FR, thereby selectively braking the front right wheel, so that an anti-spin moment is generated in the automobile.

On the other hand, when the automobile running along a leftward curved road is to be suppressed from drifting out, the changeover valves 34, 26, 50RL, 56RL, 50RR and 56RR are selectively changed over so that the wheel cylinder 124RL or the wheel cylinders 124RL and 124RR are supplied with a controlled fluid pressure, thereby selectively braking the rear left wheel or the rear left and rear right wheels, so that the automobile is suppressed from drifting out by the deceleration thereof, or further, a yaw moment is generated in the automobile around the braked rear left wheel so as to help the automobile to turn toward left.

The traction control according to the present invention may be executed in combination with such behavior controls according to an integration of calculations by the microcomputer or may be executed only when such behavior controls are not executed.

An embodiment of the traction control device according to the present invention incorporated into the hydraulic circuit shown in FIG. 2A and the electric control means shown in FIG. 2B will be described in the form of its operations with reference to the flowchart of FIG. 3.

The control operations according to the flowchart of FIG. 3 are started by a turning on of an ignition switch not shown in the figure of the automobile and are cyclically repeated until the ignition switch is turned off, as is common in this kind of art.

When the control operation is started, in step 10 signals such as those shown in FIG. 2B are read in.

In step 20, it is judged if the signal of the lever position sensor 84 for detecting the shift position of the manual lever 104A shows the high speed position. When the answer is yes, the control proceeds to step 30.

In step 30, mean wheel speed Vwfm of the front left and right wheels and mean wheel speed Vwrm of the rear left and right wheels are calculated as follows:

$$Vwfm=(Vwfl+Vwfr)$$

$$Vwrm=(vwrl+Vwrr)$$

Instep 40, traction index Vsi (i=fl, fr, rl and rr) of each wheel against the mean wheel speed Vwfm or Vwrm is calculated as follows:

$$Vsfl=Vwfl-Vwrm$$

$$Vsfr=Vwfr-Vwrm$$

$$Vsrl=Vwrl-Vwfm$$

$$Vsrr=Vwrr-Vwfm$$

In step 50, engine output power reduction index Ve is calculated as a difference between the minimum of Vwi and vehicle speed V.

In step 60, it is judged with respect to each wheel if the traction index Vsi is larger than a first threshold value K1, i.e. an appropriate allowance, and when the answer is yes, the control proceeds to step 70, whereas when the answer is no, step 70 is bypassed.

In step 70, a traction control by braking is executed such that each wheel whose traction index Vsi is larger than K1 is braked based upon the value of Vsi.

In step 80, it is judged if the engine output power reduction index Ve is larger than a second threshold value, i.e. also an appropriate allowance, and when the answer is yes, the control proceeds to step 90, whereas when the answer is no, step 90 is bypassed.

In step 90, an engine output power reduction is executed based upon the value of Ve. Then the control returns to step 10.

Thus, when the manual lever 104A of the high-low speed changeover gear 104 is shifted to the high speed position, the traction control is executed according to the program specified by steps 30–90. It will be appreciated that the traction control program by steps 30–90 controls the traction of the wheels generally based upon the balance of traction between the front wheels and the rear wheels, while allowing a certain unbalance of traction between the left and right sides of the pair of front wheels or a certain unbalance of traction between the left and right sides of the pair of rear wheels. Such a traction control will be desirable for a relatively high speed driving of the automobile, leaving the center differential in its free operation unless a certain substantial unbalance of slippage of wheels occurs between the front wheels and the rear wheels as a whole. Further, when the wheel speed of the wheel making a minimum slippage of all of the wheels exceeds the vehicle speed beyond a threshold allowance such as K2, the engine output power is reduced based upon the magnitude of the difference between the minimum wheel speed and the vehicle speed. Such a traction control program will also be desirable when the automobile is being driven at a relatively high speed.

When the answer of step 20 is no, the control proceeds to step 100, and traction index Vwsi (i=fl, fr, rl and rr) of each wheel is calculated as a difference of each Vwi against a minimum of Vwi, as follows:

$$Vwsi = Vwi - Vwimin$$

Then, in step 110, it is judged if each difference Vwsi is larger than a third threshold value K3, i.e. an appropriate allowance, and when the answer is yes, the control proceeds to step 120, whereas when the answer is no, step 120 is bypassed.

In step 120, a traction control by braking is executed such that each wheel whose traction index Vwsi is larger than K3 is braked based upon the value of Vwsi.

Thus, when the manual lever 104A of the high-low speed changeover gear 104 is shifted to the low speed position, the traction control is executed according to the program specified by steps 100–120. It will be appreciated that the traction control program by steps 100–120 controls the traction of each wheels based upon the magnitude of the slippage of each wheel against that of the wheel making a minimum slippage. Such a traction control program will be desirable when the automobile is driven at a relatively low speed in order to ensure a firm traction.

Such two types of traction controls are executed by utilizing the behavior control system as automatically changed over for adaptation to the generally high or low speed driving of the automobile in accordance with the changeover of the high-low speed changeover gear 104.

Although the present invention has been described in detail with respect to a particular embodiment thereof, it will be apparent for those skilled in the art that various modifications are possible with respect to the shown embodiment without departing from the spirit of the present invention.

We claim:

1. A traction control device of an automobile having a pair of front wheels, a pair of rear wheels, a brake system for selectively braking each of the pairs of front and rear wheels, an engine, a transmission system including a speed change gear device for selectively providing a plurality of transmission gear ratios, a center differential device, a front differential device, and a rear differential device, the transmission system transmitting rotational output power of the engine to the pair of front wheels and the pair of rear wheels with the engine output power being divided by the center differential device into a front drive power part for driving the pair of front wheels and a rear drive power part for driving the pair of rear wheels, the front drive power part being further divided by the front differential device between the pair of front wheels, while the rear drive power part being further divided by the rear differential device between the pair of rear wheels, the traction control device comprising means for detecting slipping conditions of each of the pairs of front and rear wheels, and means for controlling the brake system so as to brake at least one of the pairs of front and rear wheels for execution of a traction control according to one of at least two separate traction control programs which are automatically changed over for execution according to selections of the transmission gear ratios of the speed change gear device.

2. A traction control device according to claim 1, wherein the speed change gear device is constructed to provide a first group of transmission gear ratios for driving the automobile at relatively high speeds and a second group of transmission gear ratios for driving the automobile at relatively low speeds, the traction control programs including a first one prepared for execution with a selection of the first group of transmission gear ratios, and a second one prepared for execution with a selection of the second group of transmission gear ratios.

3. A traction control device according to claim 2, wherein the second traction control program is prepared such that when rotation speed of one of the front and rear wheels is faster than a lowest of rotation speeds of the front and rear wheels beyond a threshold value determined therefore, the one wheel is braked.

4. A traction control device according to claim 2, wherein the first traction control program is prepared such that when rotation speed of one of the front wheels is faster than a mean rotation speed of the pair of rear wheels beyond a threshold value determined therefor, the one front wheel is braked.

5. A traction control device according to claim 4, wherein the automobile comprises means for detecting vehicle speed, and the first traction control program is prepared such that when rotation speeds of all of the pairs of front and rear wheels are faster than the vehicle speed beyond a threshold value determined therefor, the engine is controlled to decrease the rotational output power.

6. A traction control device according to claim 2, wherein the first traction control program is prepared such that when rotation speed of one of the rear wheels is faster than a mean rotation speed of the pair of front wheels beyond a threshold value determined therefor, the one rear wheel is braked.

7. A traction control device according to claim 6, wherein the automobile comprises means for detecting vehicle speed, and the first traction control program is prepared such that when rotation speeds of all of the pairs of front and rear wheels are faster than the vehicle speed beyond a threshold value determined therefor, the engine is controlled to decrease the rotational output power.

* * * * *